(12) United States Patent
Wang

(10) Patent No.: US 10,441,893 B2
(45) Date of Patent: Oct. 15, 2019

(54) DEVICE FOR DEMONSTRATING A MEDICAL PROCEDURE

(71) Applicant: Joytingle PTE Ltd., Singapore (SG)

(72) Inventor: Esther ChunShu Wang, Singapore (SG)

(73) Assignee: Joytingle PTE Ltd., Singapore (SG)

( * ) Notice: Subject to any disclaimer, the term of this patent is extended or adjusted under 35 U.S.C. 154(b) by 0 days.

(21) Appl. No.: 15/801,290

(22) Filed: Nov. 1, 2017

(65) Prior Publication Data
US 2018/0290063 A1 Oct. 11, 2018

Related U.S. Application Data

(63) Continuation-in-part of application No. PCT/SG2016/050203, filed on Apr. 29, 2016.

(30) Foreign Application Priority Data

May 2, 2015 (SG) .......................... 10201503458V

(51) Int. Cl.
G09B 23/28 (2006.01)
A63H 3/00 (2006.01)
G09B 23/30 (2006.01)

(52) U.S. Cl.
CPC ............. A63H 3/003 (2013.01); G09B 23/28 (2013.01); G09B 23/285 (2013.01); G09B 23/303 (2013.01)

(58) Field of Classification Search
CPC ... G09B 23/285; A63H 3/003; A61M 2205/59
(Continued)

(56) References Cited

U.S. PATENT DOCUMENTS 4,182,054 A * 1/1980 Wise ..................... G09B 23/285
434/268
4,439,162 A * 3/1984 Blaine ..................... G09B 23/34
434/268

(Continued)

FOREIGN PATENT DOCUMENTS

CN 204650870 U 9/2015
EP 2096615 A2 9/2009
WO 2014104977 A1 7/2014

OTHER PUBLICATIONS

International Search Report for PCT/SG2016/050203.
Written Opinion of the International Searching Authority for PCT/SG2016/050203.

Primary Examiner — Alexander R Niconovich
(74) Attorney, Agent, or Firm — Prasad IP, PC

(57) ABSTRACT

Disclosed is a toy having a head, a torso, a pair of forelimbs and a pair of hindlimbs to represent a life form. The toy is a 3-D, hollow article, which is made up of a sculptured front member and a rear cover. The interior of the 10 toy has a hollow member to provide a variable volume to contain a fluid. The hollow member may be a deformable bag or a cylinder-plunger assembly. The cylinder-plunger assembly may be joined to a connector and a tube in leak-proof fluid communication. A first end of the connector is exposed to the exterior. The toy is useful for demonstrating a medical treatment or procedure involving infusing, withdrawing or transferring a fluid, or connecting a feeding or breathing tube during treatment. The toy/deformable bag may represent an organ.

13 Claims, 12 Drawing Sheets

(58) Field of Classification Search
USPC ......... 434/262, 267, 268, 272; 446/296, 472
See application file for complete search history.

(56) References Cited

U.S. PATENT DOCUMENTS

| | | | | |
|---|---|---|---|---|
| 5,314,339 A * | 5/1994 | Aponte | ................ | G09B 23/285 |
| | | | | 434/267 |
| 5,336,180 A * | 8/1994 | Kriesel | ............... | A61M 5/1409 |
| | | | | 604/131 |
| 5,411,437 A * | 5/1995 | Weber | .................. | G09B 23/281 |
| | | | | 434/267 |
| 5,518,406 A * | 5/1996 | Waters | ................. | G09B 23/285 |
| | | | | 434/267 |
| 5,842,870 A * | 12/1998 | Cramer | ................. | A63H 3/003 |
| | | | | 434/267 |
| 6,004,136 A * | 12/1999 | Ehrenpreis | ......... | A63H 33/3094 |
| | | | | 434/262 |
| 7,083,419 B2 * | 8/2006 | Winslow | ................ | G09B 23/30 |
| | | | | 434/267 |
| 7,284,986 B2 * | 10/2007 | Winnike | ................ | G09B 23/30 |
| | | | | 434/262 |
| 7,850,455 B2 * | 12/2010 | Cottler | ................... | G09B 23/34 |
| | | | | 434/262 |
| 8,113,845 B2 * | 2/2012 | Koster | ................... | G09B 23/30 |
| | | | | 434/267 |
| 8,944,825 B2 * | 2/2015 | Reid-Searl | ............. | G09B 23/30 |
| | | | | 434/267 |
| 9,342,996 B2 * | 5/2016 | King | ...................... | G09B 23/28 |
| 10,242,598 B2 * | 3/2019 | Ozaki | .................... | G09B 23/30 |
| 2002/0082564 A1 * | 6/2002 | Pham | ..................... | A61M 5/24 |
| | | | | 604/192 |
| 2006/0223039 A1 * | 10/2006 | Williams | ................. | G09B 23/30 |
| | | | | 434/262 |
| 2009/0142741 A1 * | 6/2009 | Ault | .................... | G09B 23/285 |
| | | | | 434/272 |

* cited by examiner

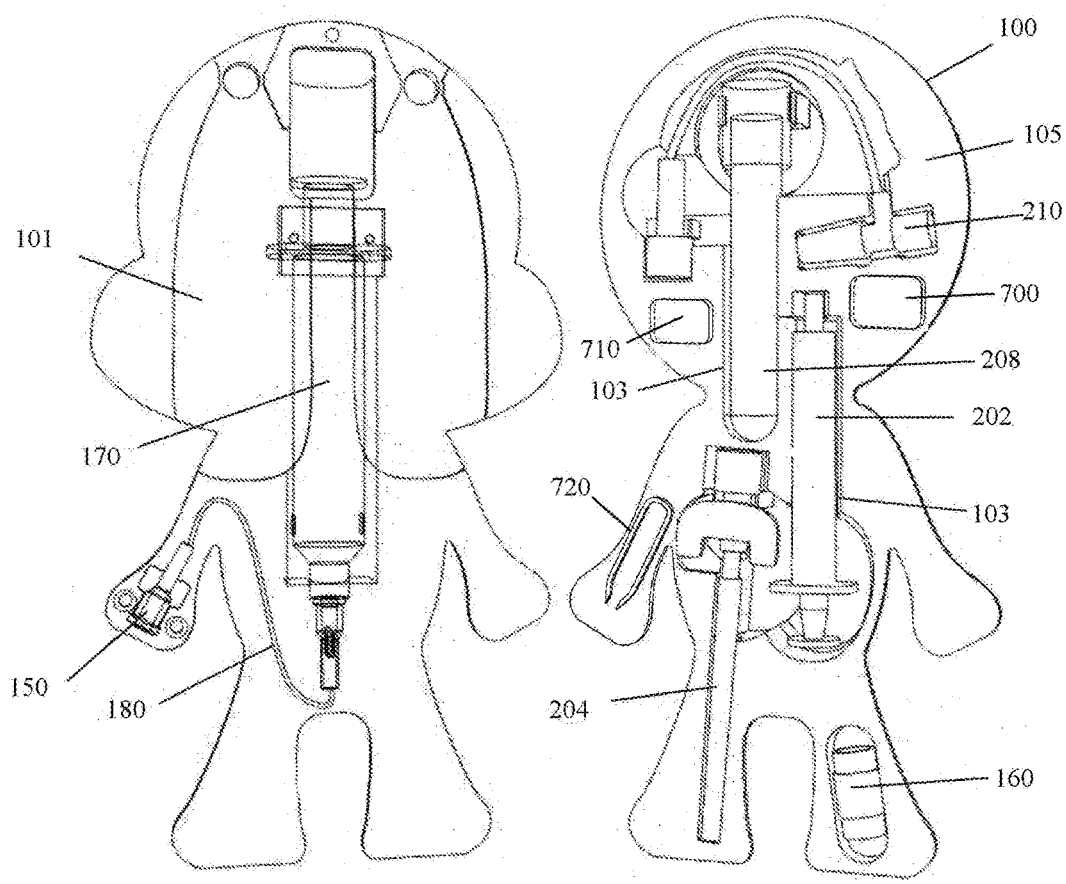
FIG. 1C
FIG. 1B
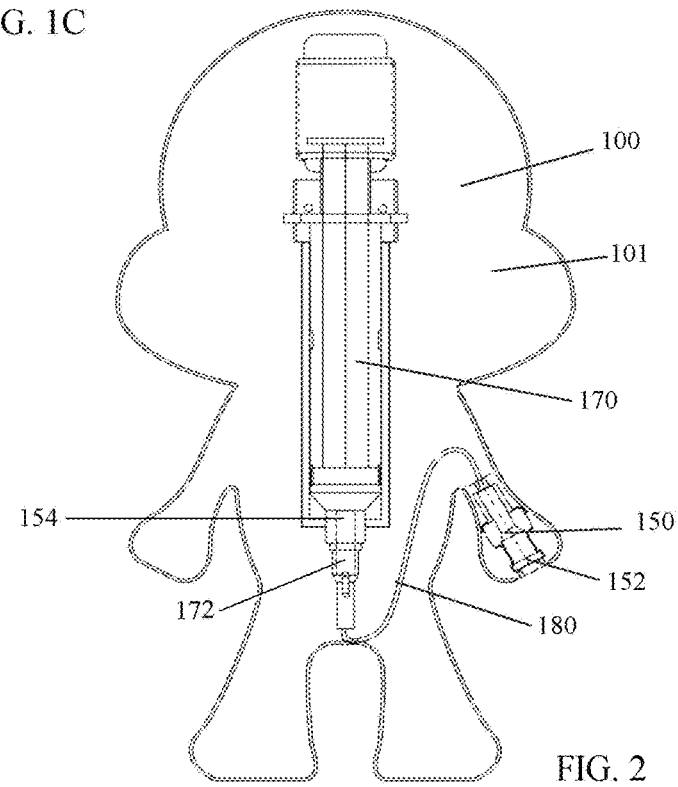
FIG. 2

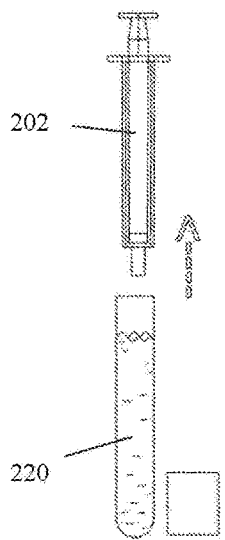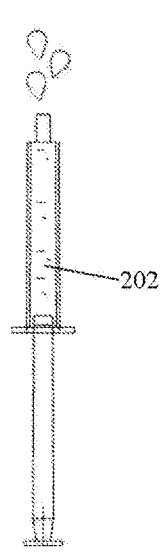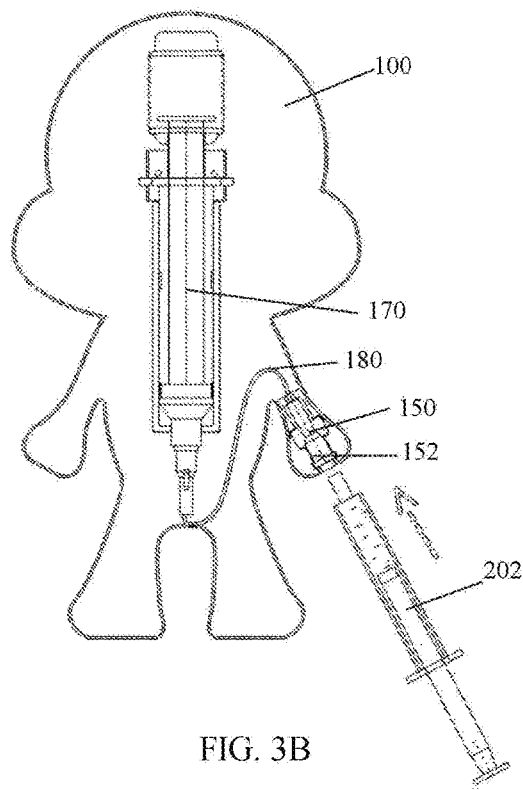
FIG. 3A
FIG. 3B
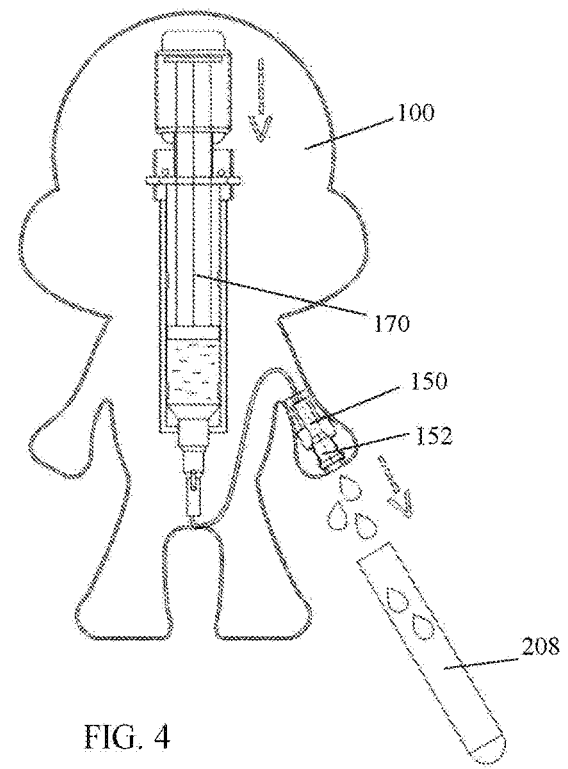
FIG. 4

DEVICE FOR DEMONSTRATING A MEDICAL PROCEDURE

RELATED APPLICATIONS

This application claims the benefit of pending PCT Application PCT/SG2016/050203, filed on Apr. 29, 2016, which claims priority to Singapore patent application 10201503458V, filed on May 2, 2015.

FIELD OF THE DISCLOSURE

This disclosure relates generally to devices for demonstrating medical procedures on people.

BACKGROUND

Communication between healthcare providers and patients can be complex and confusing to both providers and patients. Providers have significant domain knowledge, but may not understand the particular questions and fears of the patient. Children in particular are often affected by anxiety, fear or a sense of self-reproach before undergoing a medical treatment or procedure. Language barriers can also cause difficulty in effective communication which can lead to stress and misunderstanding on the part of the provider and the patient. Common medical treatments or procedures often entails infusing a substance into or withdrawing a fluid from a patient's body, or connecting a tube from a medical device into a patient's body involving transfer of a fluid (gas, liquid, wastes, food, etc). These medical treatments may involve dressing of wounds, immobilizing fractures and so on. Helping these patients allay their anxiety and fear or correcting any self-reproach is a very important step.

Conventionally with respect to children, play therapists may use toys to explain the medical treatment or procedure to the children. Others engage the children with games. In one approach, U.S. Pat. No. 6,004,136, issued to Ehrenpreis, discloses a toy bear where connectors on the bear are hidden by furs. These connectors allow toy tubes, such as, intravenous or feeding tubes, to be removably attached to the connectors. These connectors also allow replica medical devices to be connected to the toy bear.

In another approach, US Publication No. 2009053971, by Man, discloses an interactive doll, where the doll is in a healthy mode after turning on a power switch. After elapse of a time, the doll changes into a sick mode. The doll interacts by emitting a laughing or crying sound, or turning the cheeks red or green.

While these approaches explain procedures in a non-threatening way, they are not realistic nor accurate in their representation of the procedures. Moreover, the choice of materials (fur, fabric) have a high germ retention rate, which can expose elderly or children patients to infection risk.

It can thus be seen that there exists a need to use a new device to psychologically prepare patients, and particularly young patients, for medical treatments or procedures which involve infusing a fluid into, extracting a fluid from, connecting a tube into the toy, dressing of wounds, etc.

SUMMARY

The following presents a simplified summary to provide a basic understanding of the disclosed embodiments. This summary is not an extensive overview of the invention, and is not intended to identify key features of the invention. Rather, it is to present some of the inventive concepts of this invention in a generalized form as a prelude to the detailed description that is to follow.

The present invention seeks to provide a toy or device resembling a life-form for demonstrating a medical treatment or procedure. The medical treatment or procedure involves infusing a fluid into or withdrawing a fluid from a patient, or connecting a tube, bag, mask or medical apparatus into the toy/device. The toy/device is used with actual (real) medical components and this allows a patient to touch and manipulate the medical components on the toy/device. Such hands-on play with the medical components and toy/device helps to educate and prepare the patient, for example, a young child, before undergoing a treatment or performing a procedure. Such hands-on play also helps any person to learn how to clean and use medical components and supplies for inpatient, outpatient or home-based care.

Safety is paramount for first time users, and it is important to use needle-free simulations to familiarize people first. If self-administering of treatment is necessary, needles can be introduced later. While there are several mannequins to train healthcare professionals, these training materials require needles and are large, bulky, expensive and clinical looking.

Moreover, with the increasing trend of home-based healthcare, there is an important need to present medical information to children and elderly in an age-appropriate way, favouring a friendly approach over a clinical approach. "Hands-on" activity-based learning, removes the fear of the unknown and familiarizes elderly patients or children (family members) with realistic medical instruments such as catheters, medical components, syringes, dressings of wounds or immobilizing fractures that can be commonly seen in a home-based care setting.

The present invention strengthens communication between healthcare providers and families; and promotes higher memory-retention rate compared to existing print educational materials. It also reduces fear or anxiety. An additional benefit of the present invention is that it allows parents and caregivers to check how young child patients are coping emotionally with pro-longed treatment(s). Due to the present invention's unique needle-free design for fluid simulation, child patients can have independent/undirected play with the present invention. During this time, parents/caregivers should observe the child's countenance and ask open-ended questions. During user testing sessions, it has been observed that children will express their inner fears or feelings through "imaginative-play" and project their emotions by guessing how the doll is feeling. For example, "do you think the bunny will get well soon?" "how do you think the bunny feels about all these catheters in his arm right now?" This is especially useful for children who are going for medical treatments such as chemotherapy or any treatment that is longer than a clinic visit for a vaccination.

In one embodiment, the present invention provides an educational toy comprising: an article made up of a front, sculptured member to resemble a life-form or an organ and a rear member, so that the front and rear members are shaped and dimensioned to match each other and to form a 3-dimensional toy with a hollow interior; a cylinder-plunger assembly or deformable bag disposed in the hollow interior of the toy; a connector having a first end and a second end, with the connector disposed in the toy such that the first end is exposed to an exterior; and a tube connecting a cylinder end of the cylinder-plunger assembly or deformable bag with the second end of the connector for leak-proof fluid communication; wherein, when a medical component is connected to the first end of the connector, a fluid contained in the medical component, tube and cylinder-plunger assembly or deformable bag is confined in a leak-proof chamber. The medical component, tube, cylinder-plunger assembly and/or deformable bag is/are operable to simulate infusing, withdrawing or transferring the liquid in a medical treatment or procedure. The deformable bag may be used to demonstrate repeated direct infusion, withdrawal or transfer of a fluid.

The medical component may comprise: a syringe, an intravenous catheter (with or without needles), an intravenous cannula, a collection tube or container, a connector tube extension set, an adapter, a self-sealing plug, a drip bag, a feeding tube, a nebulizer, a colostomy or stoma bag, or an implant catheter. The medical component may be used with other medical supplies, such as, forceps, gauze, and plaster. The medical components and medical supplies may be fitted on an interior face of the front member or rear member, or in a tray disposed inside the toy. The tray with the components and supplies stored in an organized manner with each component and supply fitting within a specially designed space advantageously serves as a type of puzzle which stimulates interest in children.

In another embodiment, the present invention provides a kit for configuring an educational toy for demonstrating a medical treatment or procedure involving fluid transfer, body fluid collection, feeding, assisted breathing, fracture, dressing of wound, and so on.

In another embodiment, the toy of the present invention provides methods for simulating biological fluid collection by dripping, infusing/withdrawing/transferring a fluid, intravenous injection, hypodermal injection, infusing or feeding from a drip bag, assisted breathing, supplying gas, inhaled medication for respiratory treatment, body waste collection into a bag, and so on.

The disclosed devices also serve as a useful tool for teaching medical caregivers. In certain embodiments, the disclosed devices provide an intravenous catheter demonstration without the use of needles, thereby providing an effective yet safe demonstration that does not pose the danger posed by needles in untrained hands by simulating puncture without needles. Certain embodiments, provide a leakproof downward facing opening, without the use of a re-sealable material, which is typically used in devices employing needles. Moreover, certain embodiments provide the ability for users to control the speed and pace of expelling liquid from the toy to demonstrate high or low blood pressure be emphasized.

Additional aspects related to the invention will be set forth in part in the description which follows, and in part will be apparent to those skilled in the art from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques disclosed herein. Specifically:

FIG. 1B illustrates a rear, interior view of the toy shown in FIG. 1A with a tray holding some medical components and supplies;

FIG. 1C illustrates the inside view of a rear cover with an assembly of medical components and supplies;

FIG. 2 illustrates a rear, interior view of the toy according to an embodiment of the present invention;

FIG. 3A illustrates the use of a syringe and preparation for needle-free injection;

FIG. 3B illustrates infusing a fluid using the syringe;

FIG. 4 illustrates collecting blood samples by dripping into a collection tube;

DETAILED DESCRIPTION

Figure 1A:
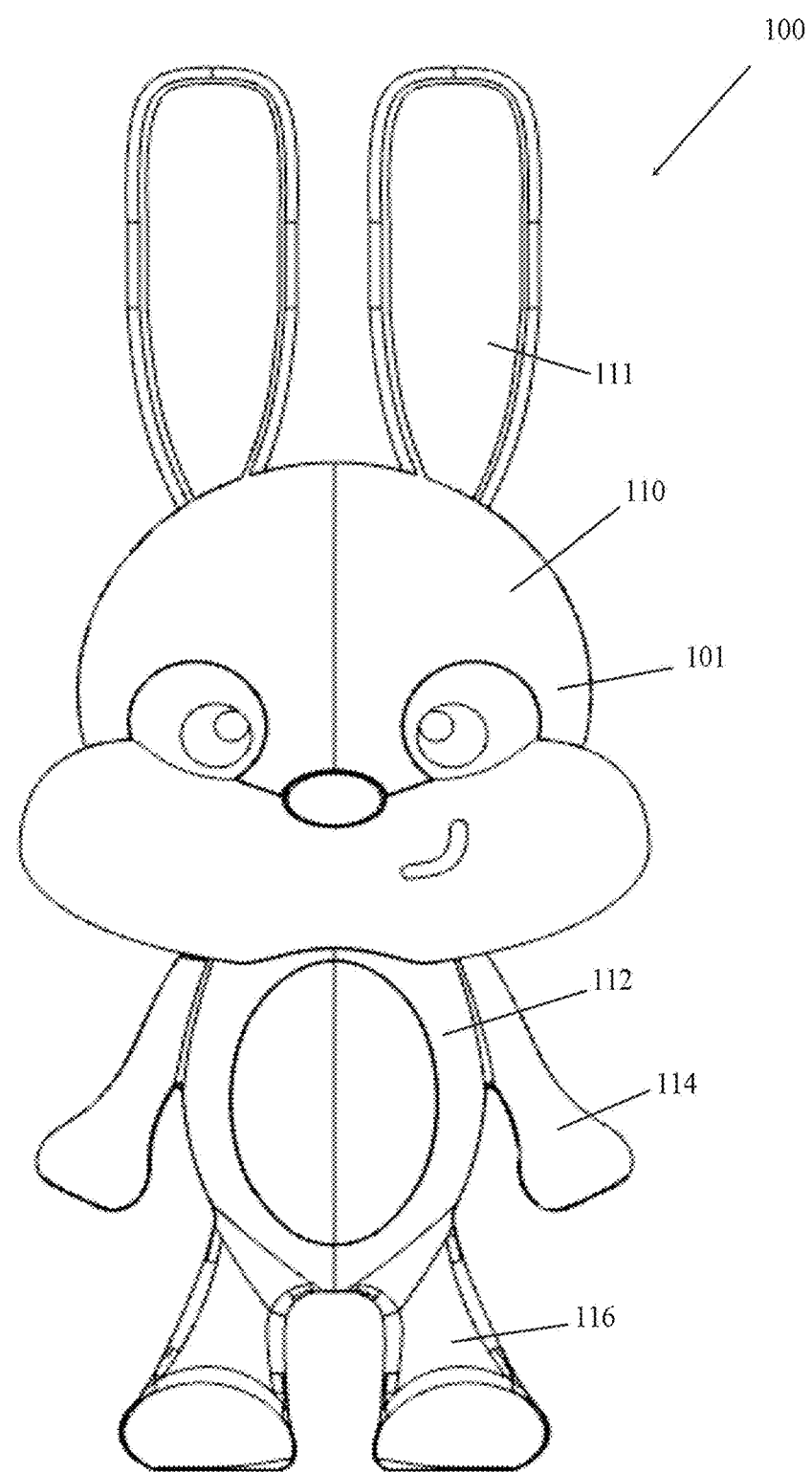
FIG. 1A illustrates a front view of a toy for demonstrating a medical treatment or procedure according to an embodiment of the present invention.

One or more specific and alternative embodiments of the present invention will now be described with reference to the attached drawings. It shall be apparent to one skilled in the art, however, that this invention may be practised without such specific details. Some of the details may not be described at length so as not to obscure the invention. For ease of reference, common reference numerals or series of numerals will be used throughout the figures when referring to the same or similar features common to the figures.

FIG. 1A shows a front view of a toy 100 for use to demonstrate applying a medical treatment or performing a medical procedure; the medical treatment or procedure involves infusing into or withdrawing a fluid from a patient, or transferring a fluid, gas or flowable substance (such as, wastes material or food) into or out from the toy 100. This may entail connecting a tube, bag, mask or medical component to a connector or intravenous_catheter. The medical treatment may also involve cleaning, closing or dressing of a wound. The toy may also be used to demonstrate proper care and maintenance of medical components, supplies and surgical openings on patients in inpatient, outpatient or home-based care. As shown, the toy 100 has a rabbit-like face and has a head 110, ears 111, a torso 112, a pair of forelimbs 114 and a pair of hindlimbs 116. The human-like form of the toy is particularly beneficial for children to communicate with healthcare professionals to identify pain that the child is feeling, as children, or patients that may not be fluent in the language of the caregiver, may be unable to accurately describe their pain. It is often more accurate for patients to point out on a model. This is especially useful at hard-to-reach places on a person's body.

The toy 100 is 3-dimensional and in one embodiment has a height of substantially 20 cm. The toy 100 is made up of a sculptured front member 101 and a rear member 102. The rear member 102 (shown in FIG. 8C) is shaped and dimensioned to snap fit with a rim at a rear of the front member 101 to form the 3-D toy 100 with a hollow interior. Preferably, the front member 101 is formed by two-colour injection molding, where the front features, such as, the eyes, nose, mouth or belly has a different colour from the rest of the body; the two-colour injection molding is to give a part of the toy a different colour from another part. To show a range of emotions in the toy, from smiling to neutral (which is understandable when a child is getting a vaccine), the smile is not a drawn outline (unlike the eyes which are drawn out in bold black). Instead the smile is created using shadows from a concave feature. The placement of the smile on the side of the face shows a cheeky personality, which is more relatable to children. With these two features together, the smile created from concave feature's shadow and the side placement mean the smile can be easily hidden by a user's finger.

The ears 111 are formed as separate parts but may be removably attached onto the head 110; an advantage is to reduce the size of the toy 100 for purposes of packaging and economical shipping. The rear member 102 has simple features and may then be transfer molded rather than injection molded. A further advantage of the ears is to encourage interactive play. For example, the ears can be flipped up to demonstrate a "power-up" of the character or flipped up repeatedly as a playful expression. Moreover, when the toy is dropped, the ears can also bend inwards, towards the body during impact. This reduces chances of breaking the ears.

In one embodiment, the rear hollow interior of the front member 101 is formed with compartments 103. In each compartment 103, an actual (real) medical component is fitted therein for use with the toy, as seen in FIG. 1B. In another embodiment, a tray 105 is fitted onto the rear of the front member 101, that is, the tray 105 is disposed in between the front and rear members when the toy is assembled. The tray 105 is also formed with compartments 103 to store various medical components and some medical supplies for use with the toy. More than one type of tray 105 may be provided depending on the types of the medical treatment to demonstrate and the medical components to use. Being molded, the toy 100 can be cleaned by wiping or washing with a cleaning and disinfecting agent.

Generally, medical personnel will use a bag or container to hold medical instruments. The tray 105 disclosed herein provides a number of educational benefits by presenting what is perceived by children as a puzzle, that has been deliberately designed to encourage children's recognition of complex shapes and hand-eye coordination. The combination of the fitted medical components presents a puzzle for young children to develop shape recognition—in particular, complex shape. In the process they become familiar with real instruments through play and thereby remove the fear of the unknown. This is an effective distraction tool if children or elderly would like to take their eyes away from the said procedure happening. Secondly, the inclusion of the instrument tray fitting the medical components, hence referred to as complex shape puzzle, helps explain to children the concept of positive shape (the instruments) and negative shape (the surrounding shapes which snaps and hold the 3D objects together). The taking-out and putting-in of the medical components allow repetitive motion which young children do, as part of their hand-eye co-ordination. In the process they become familiar with real instruments through play and thereby remove the fear of the unknown. This defuses an otherwise stressful or clinical experience.

Moreover, beyond providing an organized storage facility, the tray 105 helps parents to quickly identify if there are missing parts—which is important, in case for example, a child has swallowed a part, or if a small part may be loose and stepped on. Also, the fitting of the medical component helps to provide a convenient mobile storage of the items. A clinician or other medical personnel will use a steel kidney tray which deters patients and layperson from touching it, thereby reducing active participation in a "hands-on" educational session due to its clinical appearance. In contrast to the steel kidney tray, the tray 105 provides a neat non-threatening appearance.

FIGS. 1B and 1C show a rear view of the toy 100 without the rear member 102. The medical components that may be accommodated in the respective compartments 103 include a connector 150, an adapter 160, cylinder-plunger assembly 170, a connecting tube 180, a syringe 202, a needle-free intravenous catheter 204, an intravenous cannula 206 (seen in FIG. 6), a fluid collection container 208, 220 (seen in FIG. 3A), a connector tube extension set 210, a self-sealing plug and so on. Some medical supplies may be provided in the compartments 103, such as, a pill box 700, gauze 710, forceps 720, a flexible bag, alcohol wipes, and so on. The compartments 103 may be formed directly on the inside face of the front member 101 or rear member 102 or on the tray 105.

FIG. 2 shows the rear view of toy 100 according to an embodiment of the present invention. As seen in FIG. 2, the toy 100 is assembled with the connector 150 and the cylinder-plunger assembly 170 in fluid communication through the connecting tube 180. The interior cavities of the connector 150, cylinder-plunger assembly 170 and connecting tube 180 define a leak-proof chamber with no resealable membrane. The connector 150 has a first end 152, a second end 154 and an internal bore for fluid communication between the first and second ends. In one embodiment, each of the first and second ends is a female luer connection; in another embodiment, each of the first and second ends is a male luer connection; in yet another embodiment, the first end is a female luer connection and the second end is a male luer connection, or vice versa. In addition, or alternatively, these luer connections are of a lock type. It is possible that the first end or second end is made of other type of connection, such as quick coupling, without affecting the principle of the present invention. Again, as seen in FIG. 2, a cylinder-plunger assembly 170 is fitted to the rear or inside face of the front member 101 or on the inside face of the rear member 102 with a longitudinal axis of the cylinder-plunger assembly 170 substantially along a median line of the toy 100 and the plunger end is disposed near the head 110. The cylinder end of the cylinder-plunger assembly 170 has a nozzle 172, preferably formed as a male luer connection. As an example, the cylinder-plunger assembly 170 is a syringe of substantially 20-50 cc capacity.

FIG. 3A shows a correct procedure of using a syringe 202 to vertically draw out a liquid, such as a vaccine, from a vial or container 220; the filled syringe is then inverted and the plunger is pushed up to remove any air bubbles before use. FIG. 3B shows the syringe 202 is used on the toy 100 to demonstrate infusing the fluid without needles. For demonstration, the liquid may be a dye. The nozzle of the syringe 202 is connected into the first end 152 of the connector 150. By pushing the plunger of the syringe 202, the liquid content is injected into the interior of the tube 180 and cylinder-plunger 170 to simulate an injection procedure. To demonstrate another procedure, the interior cavity of the tube 180 and cylinder-plunger 170 is filled with a red liquid; when the syringe 202 is inserted into the connector first end 152, the plunger of the syringe 202 is retracted to draw the red liquid into the syringe 202 to simulate withdrawing of blood. This is a necessary step for nurses to check the catheter is unobstructed.

The embodiment shown in FIGS. 3A-5B allows a patient to play with an actual syringe used by a doctor or nurse. This familiarizes the patient with medical components and supplies, thereby helping patients to allay fear before conducting a treatment. This embodiment may also be useful to train a care-giver in infusing or withdrawing/draining/collecting a body fluid from a patient.

Figure 7A:
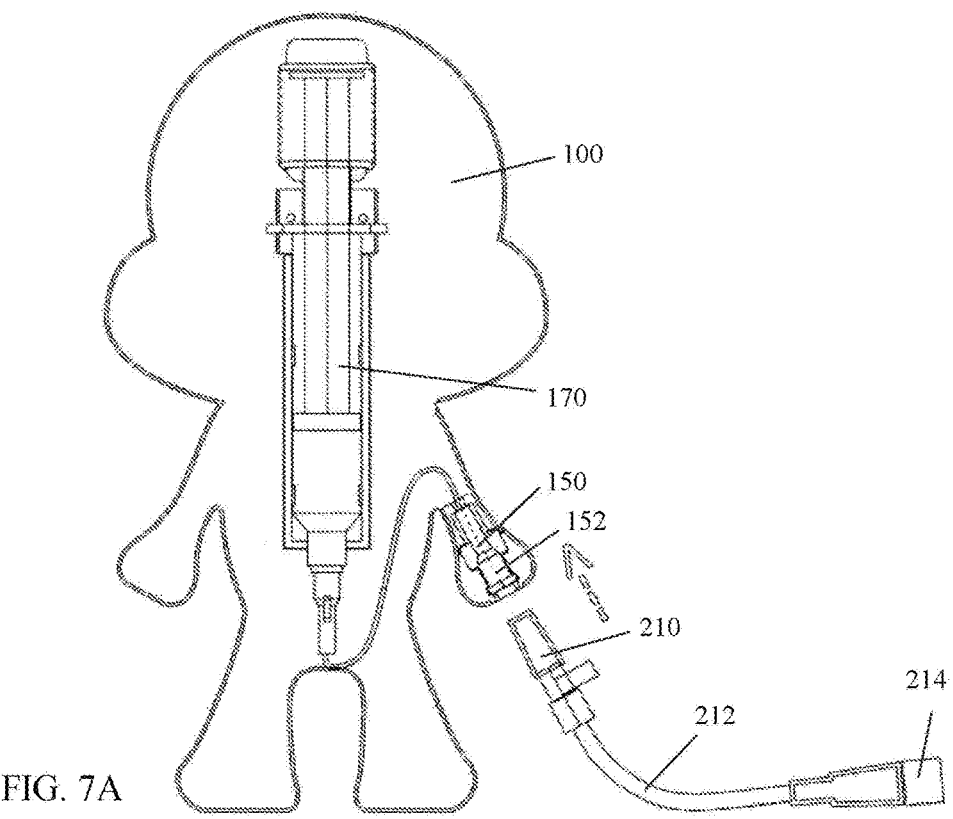
FIG. 7A illustrates the use of a connector tube extension set.

The above manner of withdrawing blood with a syringe from a small child or adult with small veins may not be possible. Instead, blood may be collected from a patient by puncturing the tip of a finger or inserting an IV catheter into a vein and allowing blood to drip into a container or vacutainer. This procedure is known as the drip technique. FIG. 4 illustrates the "drip technique" of collecting blood samples by dripping it into the collection tube or container 208 or bag. This procedure is typically demonstrated with needles, but FIG. 4 illustrates that this invention achieves the same demonstration without needles. The dripping can start or end at the user's will. The cylinder-plunger 170 is partially filled with the red liquid; by pushing of the plunger, the red liquid is pushed out, flowed along the tube 180 and drip out of the first end 152 of the connector 150. This embodiment allows a patient first-hand experience to handle a blood-like liquid; this is useful for educating a young child or psychologically preparing a child for collecting a blood sample. A drip technique for drawing blood can take 20 minutes to 2 hours, depending on the speed of the child's blood flow. Hence it is paramount for the child to be prepared adequately to motivate them to keep still during the long procedure. To demonstrate another procedure for blood sample collection known as the scalp-vein needle, the extension tube 212 is connected to the first end 152 of connector 150 (as seen in FIG. 7A). The syringe 202 is connected to the female luer end 214 of extension tube 212. The plunger of cylinder-plunger assembly 170 is pushed down to expel blood-like liquid into extension tube 212 and eventually syringe 202.

The choice to use a syringe instead of a conventional bag to for liquid storage permits not just fluid storage but also provides an active vessel which allows the user to adjust the pressure at which fluid is expelled at will. This permits the user to control the speed and pace of expelling liquid to demonstrate high-pressure or lower pressure of blood flow instead. It should be noted that the use of a syringe presents a design challenge to allow the length of the syringe to be accommodated in its open (or elongated) position within the toy.

With conventional techniques, a medical personnel would use a real needle to demonstrate certain procedures. This requires healthcare professionals' time for an extra step—demonstrative education, which is a rare luxury in many overworked clinics and hospitals. The use of needles is unsafe for children and adult patients with weak eyesight or poor hand-eye co-ordination. In certain embodiments of the toy 100 disclosed herein, such procedures may be demonstrated without needles (such as shown in FIGS. 3A-7B), thereby availing caregivers to take on the role of a facilitator and educators (guided by a book, app and digital platform) with the patient before the procedure, thereby freeing healthcare professionals to focus on their roles. This turns waiting time into learning time, plus it also promotes family bonding with safe hands-on learning.

Moreover, conventional techniques only permit demonstration of fluid injection or withdrawal of fluid from the body—procedures which are controlled from the needle. But conventional techniques are unable to demonstrate expulsion of fluid from the body at varying pressure, which is described in more detail below. Moreover, in certain embodiments, two-way fluid direction without needles is achieved. Also, elimination of a needle eliminates the need for a re-sealable material.

If a blood draw is required, typically, a person skilled in blood drawing will squeeze the water-impermeable plastic bag to demonstrate the expulsion of fluids. However, the expulsion of fluids will be at a random speed and random angles of expulsion which will result in spillage and mess. In certain embodiments, a cylinder-plunger system may be employed. With such a system, users can control the speed to demonstrate a high blood pressure (hence faster pace of expulsion) or low blood pressure (hence slower rate of expelling liquid from the toy 100's interior volume). This is shown in FIG. 4, the harder we press on the cylinder plunger assembly the faster the liquid ejects out. This provides a demonstration of higher blood pressure.

Moreover, in certain embodiments, the fluid may be expelled in a fixed angle, such as shown in FIG. 4 which makes it predictable for users (families, layperson, medical personnel) to position the corresponding vacutainer or test tube accordingly to collect the expelled fluid as a demonstration of drip-technique (a blood drawing procedure), or blood glucose monitoring. It should be noted, that hand-squeezing will only allow a one-direction flow of the fluid, whereas the foregoing embodiments with the cylinder-plunger arrangement will, achieve bi-directional flow (flow in two directions) without the use of needles, extra catheters. Such embodiments also stop the flow of the fluid at will, without the use of a reseal-able material. Moreover, in such embodiments, the plunger may be adjusted to expel or suck back in fluid.

Figure 5A:
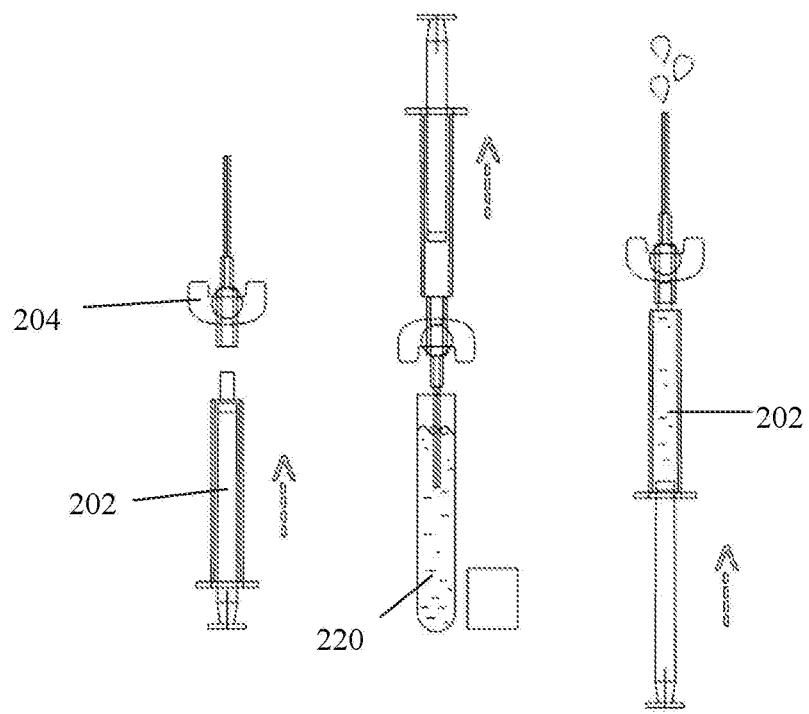
FIG. 5A illustrates the use of an intravenous (IV) catheter and syringe.
Figure 5B:
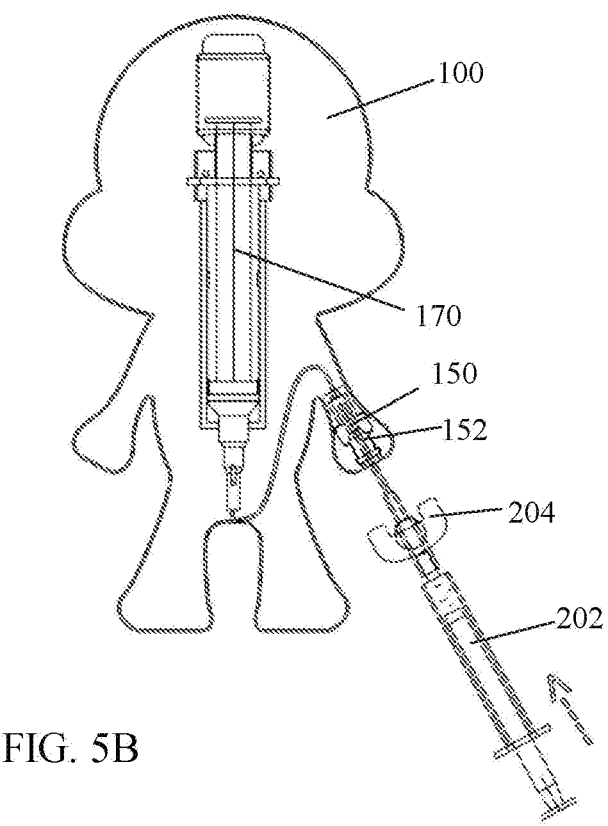
FIG. 5B illustrates injecting a vaccine with the IV catheter.

FIG. 5A shows a procedure of attaching the IV catheter 204 to a syringe 202, inverting the syringe and extending the plunger to fill the syringe 202 with a vaccine, and removing air inside the syringe 202 and IV catheter 204 before use. FIG. 5B shows the filled syringe and IV catheter is used to demonstrate an IV injection. The tube of the IV catheter 204 is inserted into the connector 150 and the plunger of the syringe 202 is pushed in so that the content of the syringe is transferred into the interior cavity of the cylinder-plunger assembly 170 via the connecting tube 180.

Figure 6:
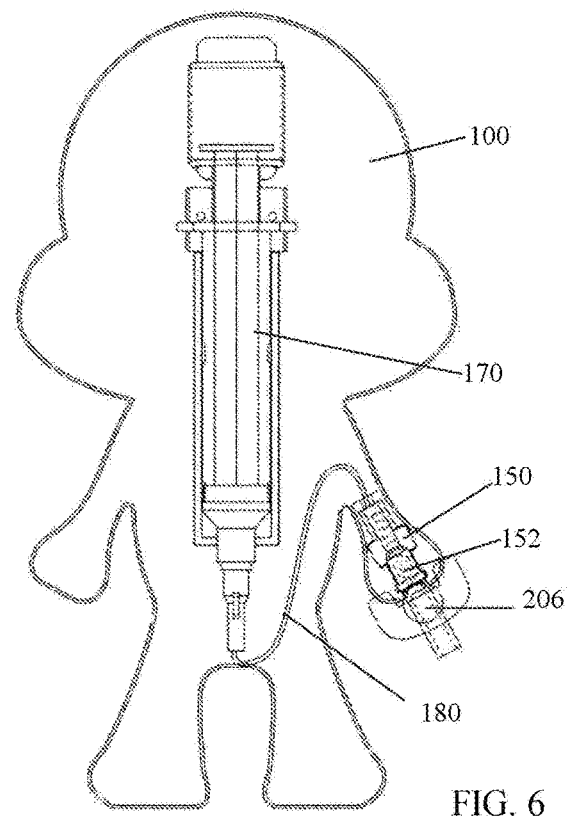
FIG. 6 illustrates the use of an intravenous plug or cannula.
Figure 7B:
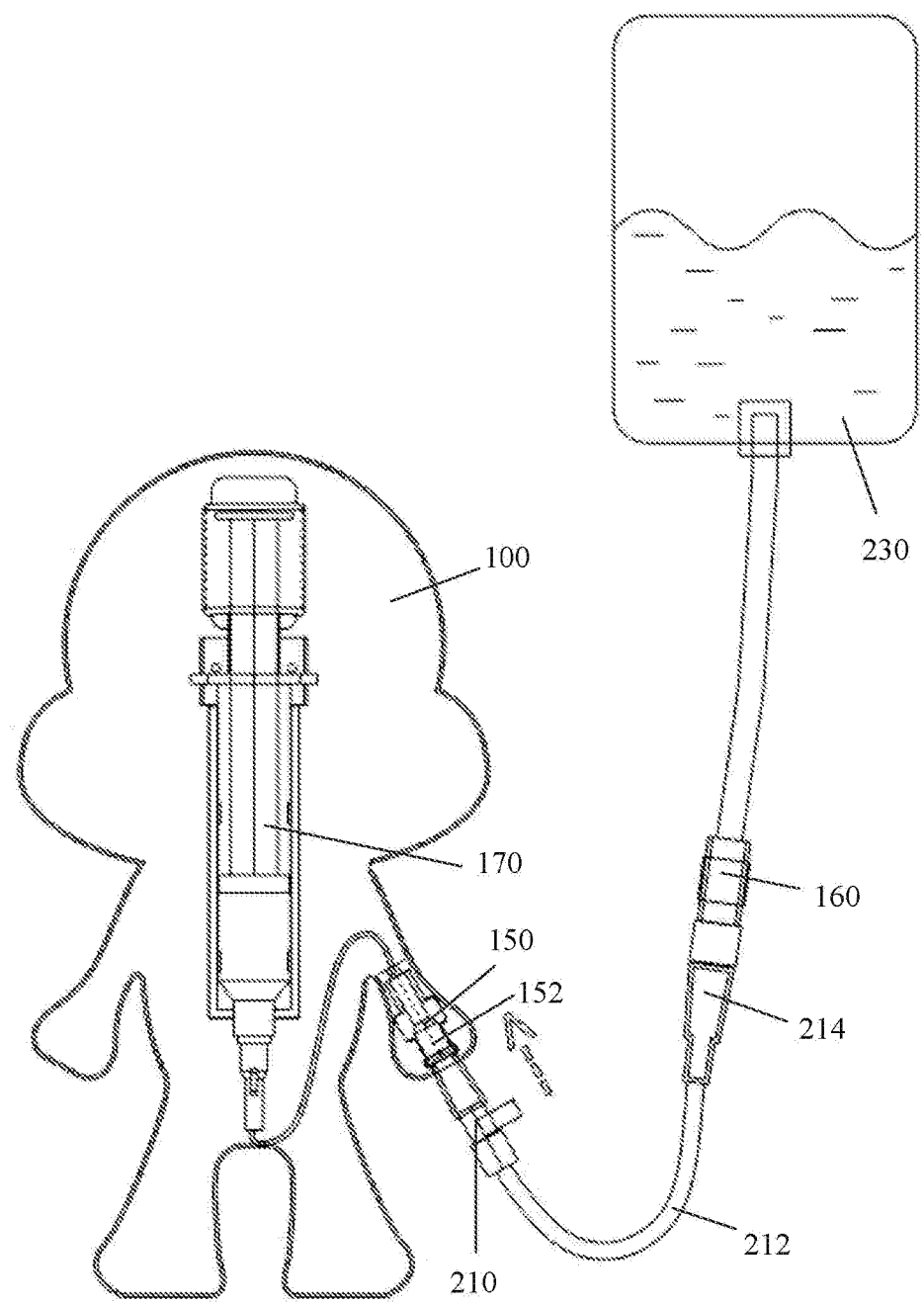
FIG. 7B illustrates infusing a fluid from an intravenous drip bag through the connector tube extension set.

FIG. 6 shows another embodiment of the toy 100 where an intravenous cannula 206 is connected to the first end 152 of the connector 150. As an example, the intravenous cannula 206 has a male luer end that matches with the female luer end 152. This embodiment is useful for demonstrating intravenous injection (such as, in vaccination), withdrawal, say of blood, or for connection via a connector extension set 210 to a medical device (as seen in FIGS. 7A-7B) or for connection with other medical apparatus.

FIG. 7A shows another embodiment of the toy 100 where a connector tube extension set 210 is connected to the first end 152 of the connector 150. As shown, the connector tube extension set 210 has a male luer end that matches with the female luer end 152 of the connector 150, whilst a second end of the connector tube extension set is threaded and is connected to an extension tube 212. The extension tube 212 terminates with a female luer end 214. The female luer end 214 is connectable with a matching adapter 160 for supplying a fluid from a drip bag 230, as seen in FIG. 7B. The motion of connecting these parts help children's hands strengthen their fingers' grip on small parts and twisting motion.

Figure 8A:
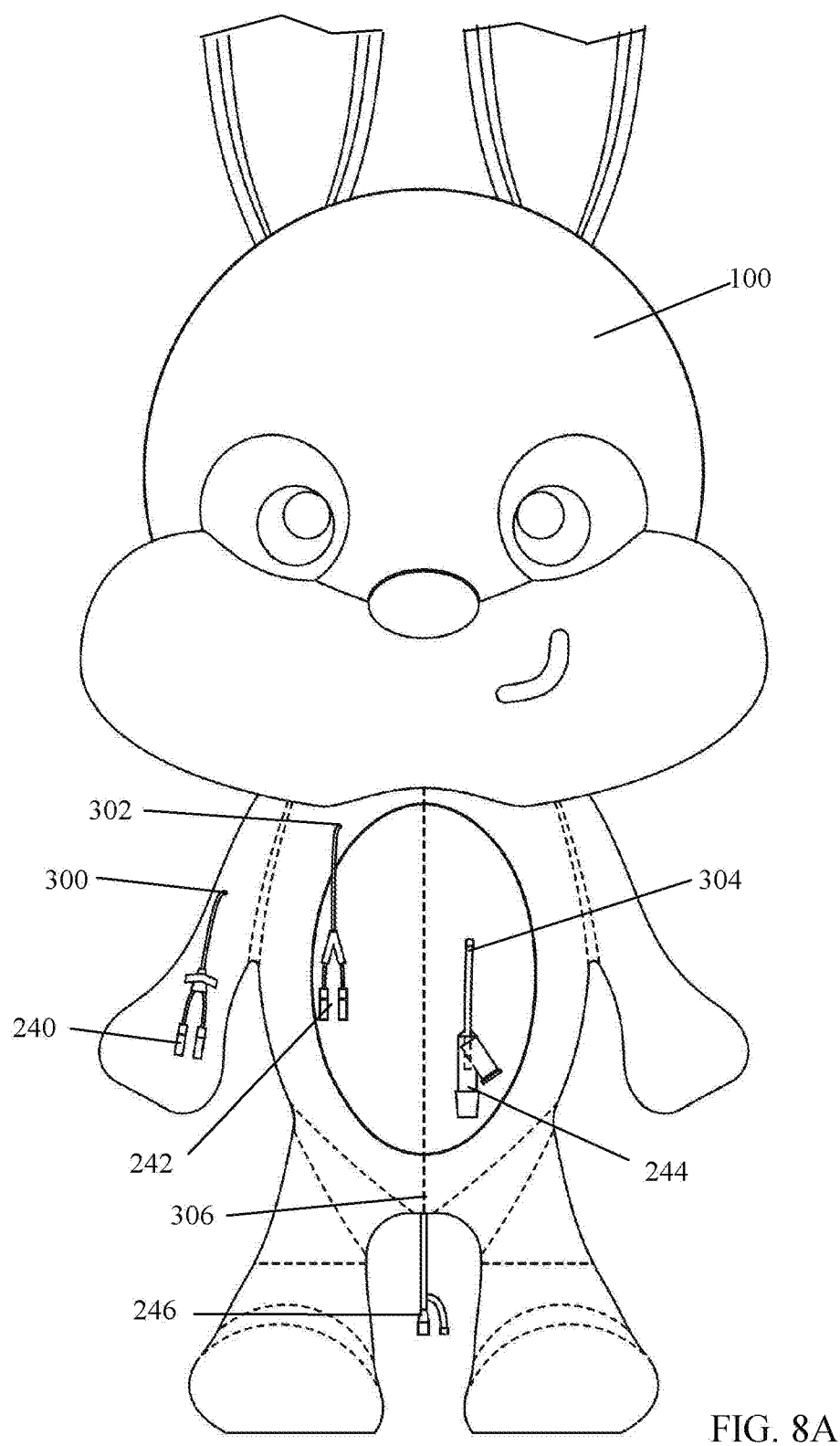
FIG. 8A illustrates positions of other intravenous injection or body intervention sites.

In the above figures, the connector 150 is shown located on a tip of the right upper limb for ease of description. The connector 150 can be located on any part of the toy 100 to demonstrate transfer of liquid, intravenous infusion or injection or hypodermal injection, feeding, suction or removal of mucous, body waste removal through draining. For example, the first end 152 of the connector is shown to be located 300 at a mid-section of the upper limb and the first end 152 is connected to a Peripherally Inserted Central Catheter (PICC) 240, as shown in FIG. 8A. In addition, FIG. 8A shows the first end 152 is located 302 at the upper chest and is connected to a catheter 242 to represent a Hickman Line. To demonstrate feeding, the first end 152 is located 304 at a mid-section of the stomach (gastrostomy); when the connector 150 is located further downwards to the small intestines (jejunum) and the first end 152 is connected to a catheter to represent Percutaneous Endoscopic Gastrostomy (PEG) 244 or Percutaneous Endoscopic Jejunostomy (PEJ). In another embodiment to demonstrate draining, the first end 152 is located 306 at the pelvic area to the bladder and first end 152 is connected to a suprapubic catheter or urine catheter 246. These treatment options may be presented as a singular intervention on the patient or as a combination of treatments.

Figures 8B, 8C:
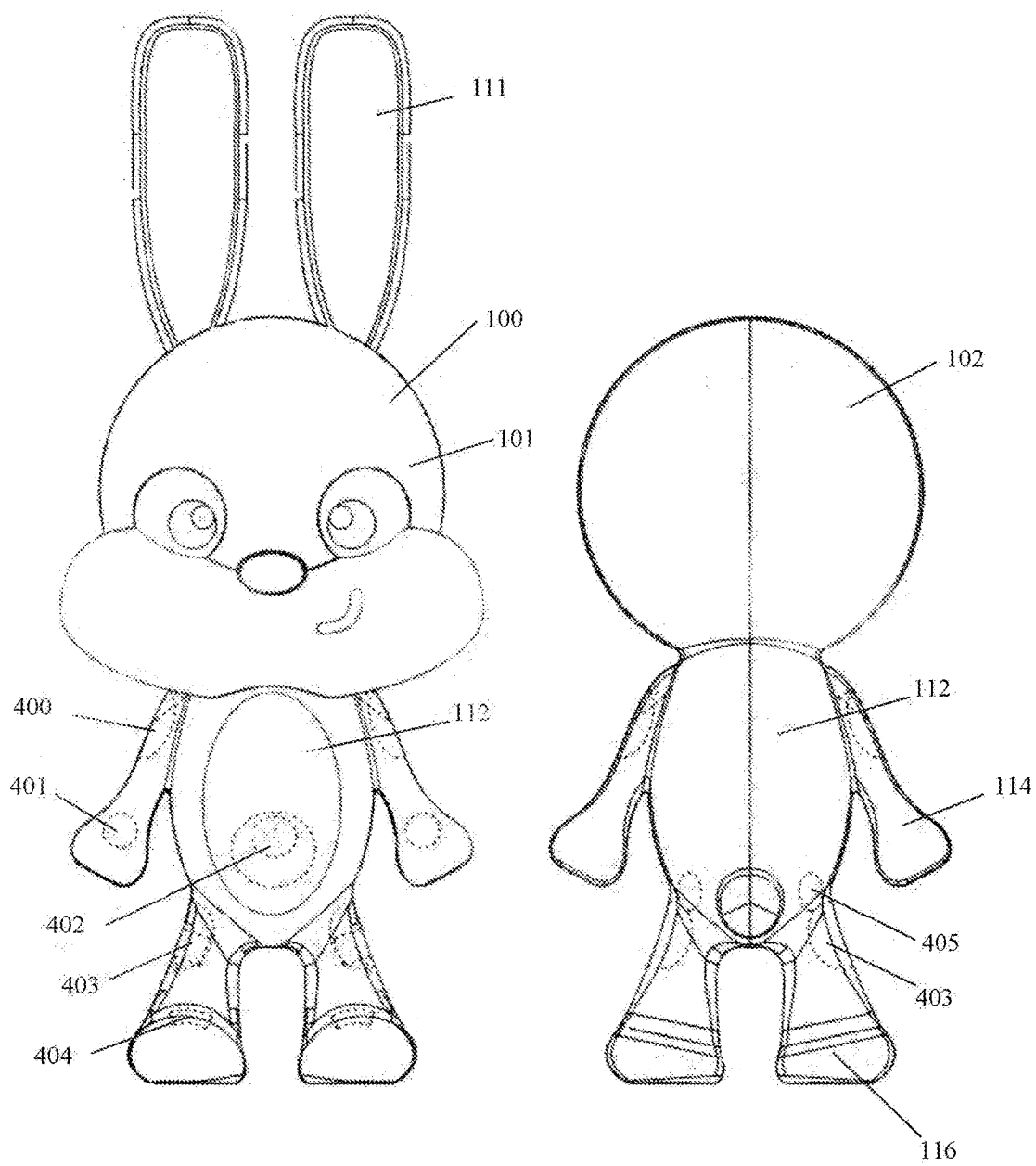
FIGS. 8B and 8C illustrate positions of other hypodermal injection sites.

FIGS. 8B and 8C show multiple sites for hypodermal injection, for example with insulin. Hypodermal injection includes intra-muscular and subcutaneous injection. The first end 152 of the connector 150 may be located at the upper limbs 114, torso 112, lower limbs 116 or buttock to represent sites 400, 401, 402, 403, 404, 405 for hypodermal injection. Multiple injection or intervention sites allow site rotation. The first end 152 of the connector may be covered by the self-sealing plug or self-sealing material to allow repeated insertion of needles or catheter during treatment. This toy 100 is useful for demonstrating self-help in insulin injection.

Figure 9A:
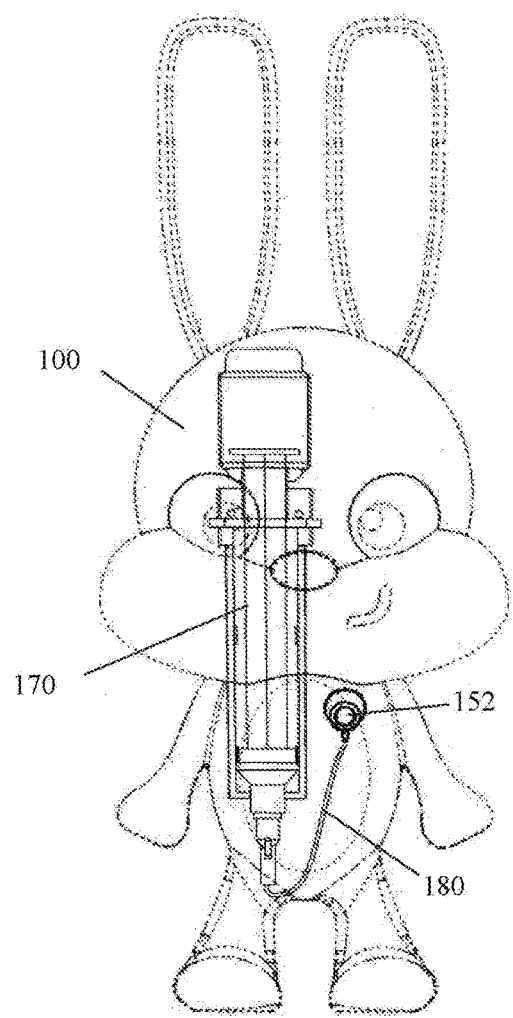
FIG. 9A illustrates an implanted Port-A-Cath disposed underneath the skin of the anterior chest wall.
Figure 9B:
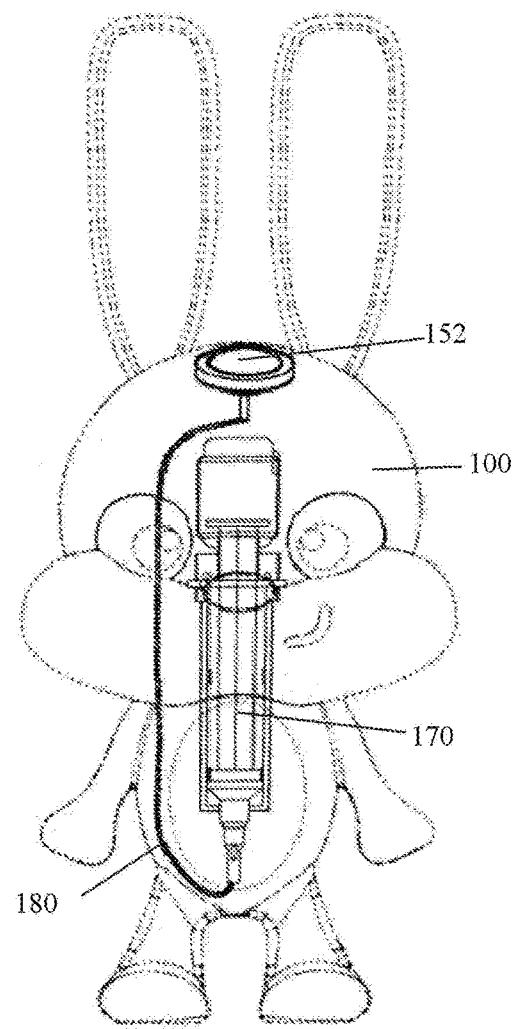
FIG. 9B illustrates an Ommaya port disposed underneath the skin of the scalp.

FIG. 9A shows the first end 152 is located on an anterior chest wall; this connector represents a Port-A-Cath that is implanted under the skin of the anterior chest wall and is used to receive repeated insertion of needles, for example, during chemotherapy treatment or frequent blood withdrawals. In FIG. 9B, the end 152 is located on a scalp and this connector is used to represent an Ommaya device that allows direct medical access to the cerebrospinal fluid.

Figures 10A, 10B:
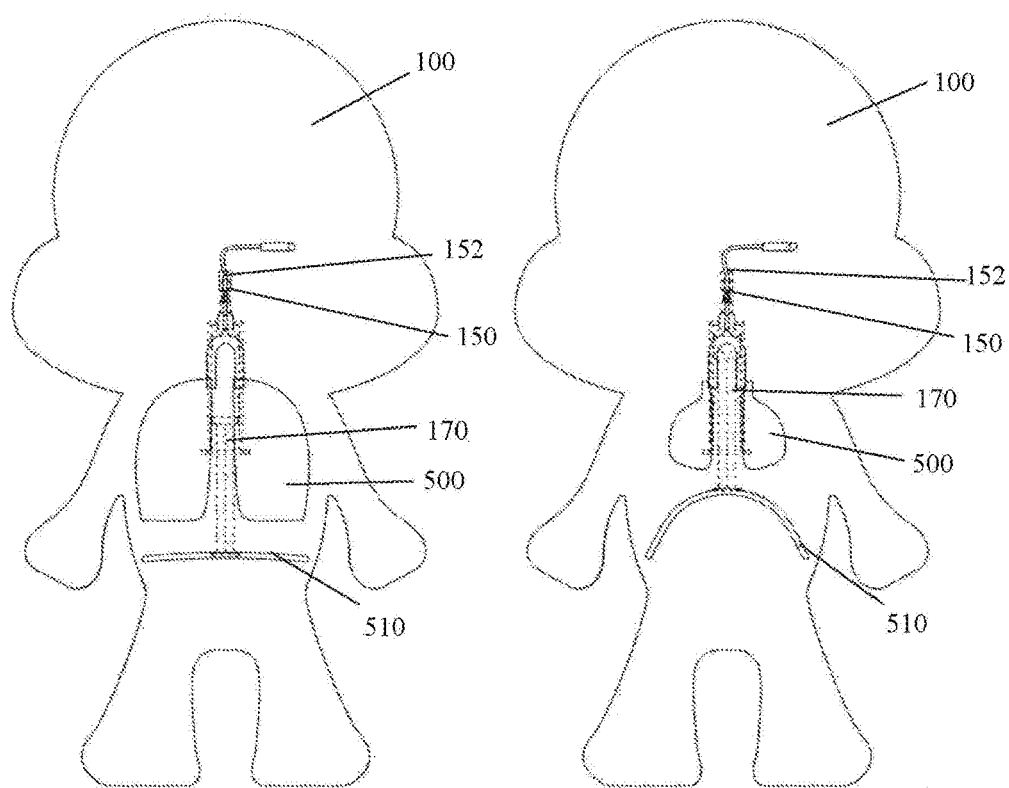
FIGS. 10A and 10B illustrate connecting a breathing tube through a nasal opening.

In FIGS. 10A and 10B, the first end 152 of the connector 150 is located in the nose. A tube can be connected to the first end 152 and supplied with air/gas to demonstrate assisted breathing, asthma treatment, anesthetic procedure and so on. In addition, air bags 500 may be connected in parallel to the cylinder-plunger assembly 170 to demonstrate inflation and deflation of the lungs during breathing. An elastic band 510 can also be attached to the plunger of the cylinder-plunger assembly 170 to demonstrate functioning of a diaphragm during breathing.

Figures 10C, 10D:
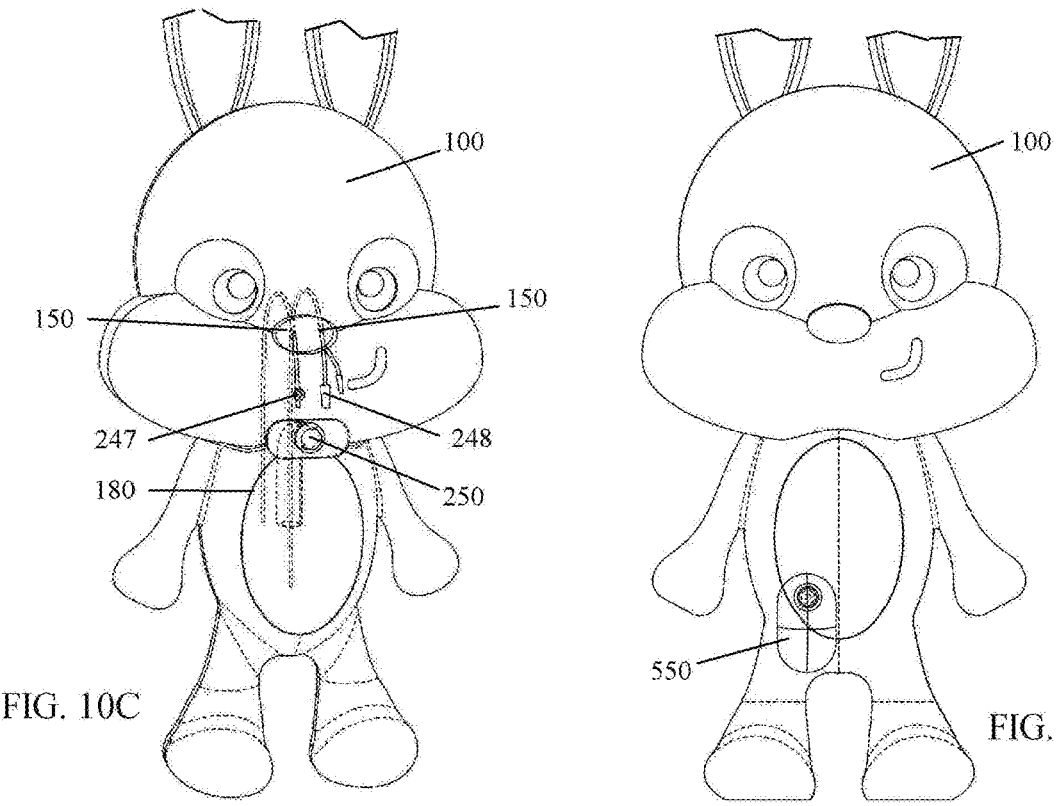
FIG. 10C illustrates a nasal trachea intervention and feeding tube.
FIG. 10D illustrates use of a colostomy or stoma bag for waste collection.

The above embodiment can be modified to demonstrate the use of a draining or feeding procedure. For example, the first end 152 is located at the nose and connected to an Oral-Nasal Suction catheter 247 to demonstrate oral-nasal suction to remove mucous build up along the trachea or wind pipe or lungs, as seen in FIG. 10C. To simulate removal of mucous, the internal cavity of the cylinder-plunger assembly 170 and tube 180 may be filled with a green fluid. It is also possible to implant a trach tube 250 to the trachea as an artificial nose for breathing, for example, when there is an obstruction in the upper airway. In another example, the first end 152 of the connector 150 is connected to Nasogastric Feeding tube 248 to demonstrate feeding from nose tube directly into the stomach. In yet another example, the first end 152 of the connector is connected to a colostomy bag or stoma bag 550, as seen in FIG. 10D; the first end 152 is located near the bladder, colon or ileum and the bag demonstrates biological wastes collection from the bladder or colon. This embodiment is useful to patients, especially young children, to practice disinfecting the stoma area and changing the colostomy or stoma bag during self-help. To demonstrate another procedure, the interior cavity of tube 180 and cylinder-plunger 170 is filled with a yellow or brown liquid and the plunger of cylinder-plunger 170 1s pushed to simulate body waste discharge.

Figure 10E:
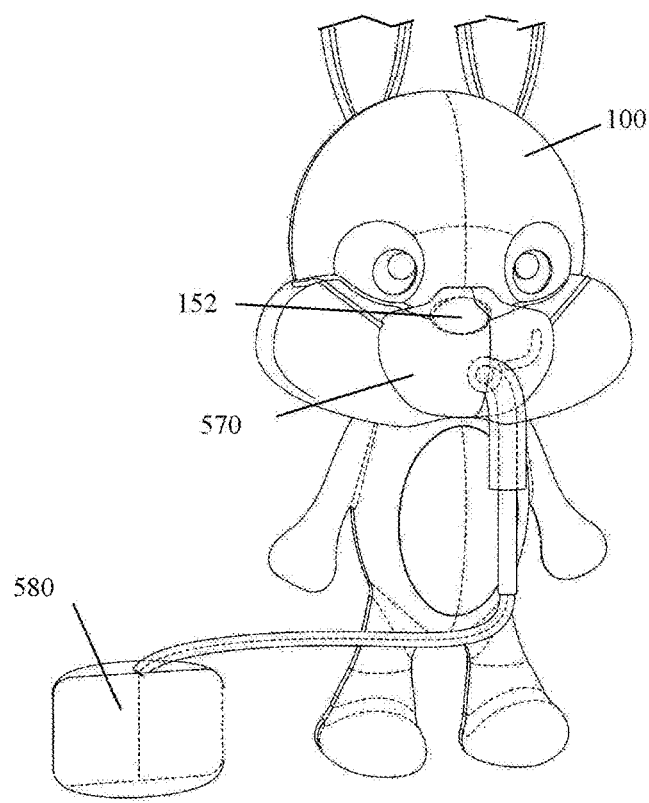
FIG. 10E illustrates use of a nebulizer.

In FIG. 10E, the first end 152 is also located at the nose but is used with an external apparatus 570, 580 (such as, an inhaler, spacer or nebulizer) to demonstrate the use and application of inhaled medication for asthma treatment or pre-surgery (anesthetic).

Figure 11:
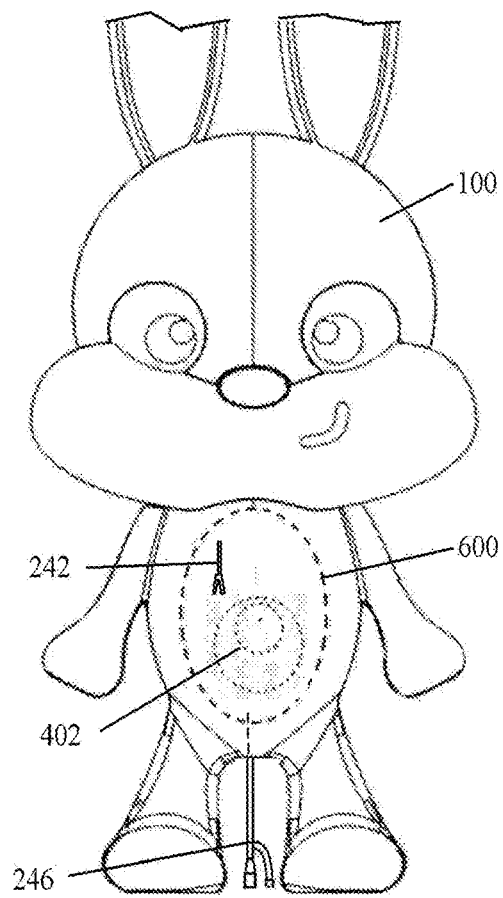
FIG. 11 illustrates a deformable, resealable bag to provide a leak-proof, variable interior volume according to an alternate embodiment.

In the above embodiments, the interior cavity of the cylinder-plunger 170 and tube 180 provides a leak-proof internal variable volume for containing a fluid. This variable volume allows liquid, gas or fluid to be infused, injected, inhaled, discharged, withdrawn, transferred, and so on, to demonstrate various medical procedures and treatments. FIG. 11 shows an elastic or deformable bag 600 used to provide an internal variable volume as an alternative to the cylinder-plunger assembly 170. In FIG. 11, the connector 150 is fluidly connected to the elastic or deformable bag 600. The elastic or deformable bag 600 may be of a similar material as the above resealable material or a portion being made of a resealable membrane to allow predetermined numbers of repeated insertion and withdrawal of needles or catheters without fluid leakage. With the deformable bag 600 made of the resealable membrane, the deformable bag need not be fluidly connected to the connector 150 by the tube 180, and the deformable bag 600 allows direct insertion and withdrawal of needles or catheters, such as, for diabetic treatment with insulin at location 402 or catheters 242, 246.

Figure 12:
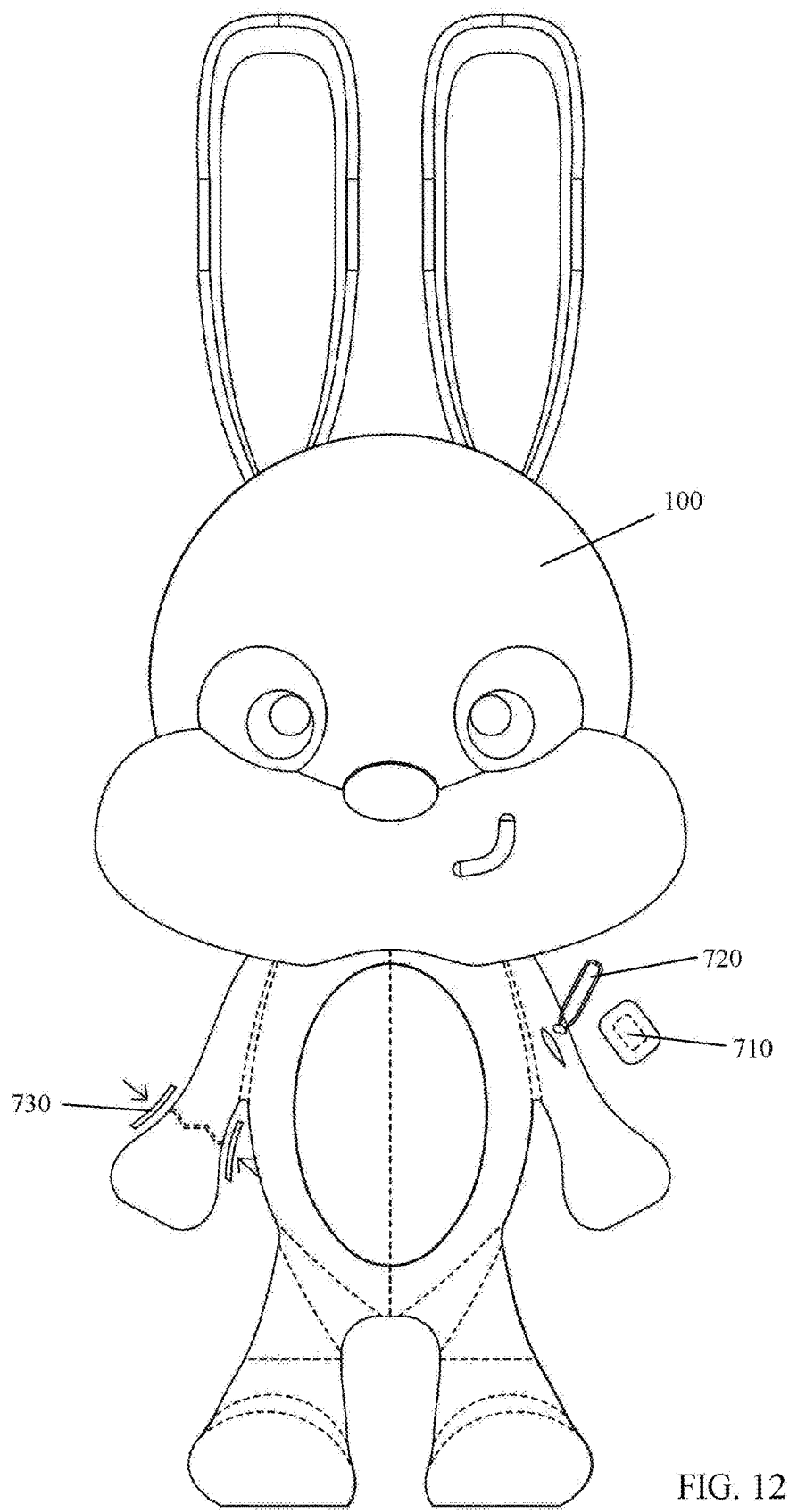
FIG. 12 illustrates cleaning of wounds and immobilizing of a fracture or sprain.

In another embodiment, two adjacent deformable bags 600 may be joined by a tube in the toy 100 to represent a bladder and a kidney; a demonstration of reverse flow of urine from the bladder to the kidney is useful to teach patient on bladder control, urinary hygiene and complication of urinary tract infection. After a medical treatment or procedure has been performed, the surgical wound needs to be cleaned, closed up and dressed. A wound on the skin can also be caused by cut or other accidents. FIG. 12 shows the use of a forceps 720 to apply a piece of cotton for cleaning a wound or for removing a foreign body, whilst a gauze 710 or plaster is used for dressing up a wound. FIG. 12 also shows the use of a bandage to secure a pair of splints 730 for support at a fracture. A bandage can also be used to provide support at a sprained joint.

With the present invention, the above disclosed embodiments of the toy 100 allows children to touch and play with actual (real) medical components; hands-on experience and role-play tend to have deeper impressions on children, thus are able to help children overcome fear of a medical treatment or procedure, sight of blood, biological discharge, needles and other medical implements. The toy 100 also helps to bridge communication between a patient and the guardian/care-giver and/or medical personnel, for example, when a patient is pre-verbal. The toy can be used in schools for general education or in health-care institutions; in this respect, the toy is helpful when the schools or health-care institutions are located in a country which uses a different language or has a different culture. In addition, the toy allows children to be engaged in waiting rooms or during traveling. Children can use the toy to role-play with the child assuming the role of a doctor or a nurse, while the toy assumes the role of a patient. Through role-playing, it allows children to process their thoughts and creates a safe environment for children to ask questions about their health. In addition, the toy can be further engaged through an augmented reality app, attached with a removable sticker or transparent plastic thin sheet printed with the anatomically accurate pictures of the internal organs and catheters, tubes, medical device's locations in the body for more accurate visual representation.

The above toy 100 is molded with rabbit features. It is possible that the toy 100 is formed to represent another type of animal. It is also possible to mold the toys 100 as anatomically accurate life forms, organs or a set of organs. After use, the toys 100 can be dismantled, the medical components removed and cleaned of any liquid, and all the parts can be cleaned and sanitized.

While specific embodiments have been described and illustrated, it is understood that many changes, modifications, variations and combinations thereof could be made to the present invention without departing from the scope of the invention. For example, some specialized implant catheters have been described for the bladder, stomach, intestines, trachea, skull, veins, etc. but these are not so limited. Other alternatives, modifications, and equivalents as may be within the spirit and scope of the invention as defined by the appended claims.

What is claimed is:

1. An educational device comprising:
   an article made up of
      a front, sculptured member molded to resemble a life-form or an organ and
      a rear member that is molded and separate from and attachable at a rim of the front, sculptured member, so that the front and rear members are shaped and dimensioned to match each other and to form a 3-dimensional device with a hollow interior;
   a hollow, deformable member comprising a variable interior volume disposed in the hollow interior of the device;
   a connector having a first end and a second end, with the connector disposed in the device such that the first end is exposed to an exterior; and
   a tube for connecting the hollow member with the second end of the connector with leak-proof fluid communication;
   wherein, when a medical component is connected to the first end of the connector, a fluid contained in the medical component, tube and hollow deformable member is confined in a leak-proof chamber and wherein the device is operable to simulate infusing, withdrawing or transferring of the fluid during a medical treatment or procedure.

2. The device according to 1, wherein the article comprises a head, a torso connected to the head, and a pair each of forelimbs and hindlimbs connected to the torso.

3. The device according to claim 2, wherein the first end of the connector is accessed to simulate medical procedures performed at one or more locations from the group consisting of: an extremity of a forelimb or hindlimb, forelimb, hindlimb, torso, and head.

4. The device according to claim 1, wherein the medical component is selected from the group consisting of: a syringe, an intravenous catheter, an intravenous cannula, a collection tube or container, a connector tube extension set, an adapter, a self-sealing plug, a drip bag, a feeding tube, a nebulizer, a colostomy or stoma bag, and an implant.

5. The device according to claim 4, wherein each medical component is fitted into a respective compartment formed in an interior face of the front, molded sculptured member, and each medical component is snapped fitted at one or more points.

6. The device according to claim 4, wherein each medical component is mounted on an interior face of the molded rear member.

7. The device according to claim 4, further comprising a tray disposed in the toy to hold two or more of the medical components.

8. The device according to claim 1, wherein the hollow deformable member is selected from the group consisting of a cylinder-plunger assembly, a syringe and an elastic bag made of a resealable membrane.

9. The device according to claim 8, wherein the hollow deformable member has a larger capacity than a capacity of a syringe for use to connect with the first end of the connector.

10. The device according to claim 8, wherein the cylinder-plunger assembly is operable to simulate fluid flow at either a high speed to simulate high fluid pressure, or a low dripping pace to simulate low fluid pressure, wherein, when the syringe is inserted to remove or inject fluids in a simulation of medical treatments or procedures, without piercing any materials, the cylinder-plunger assembly is operable to simulate both one-way and two-way fluid exchanges comprising direct infusing, withdrawing, or transferring fluid, thereby demonstrating conduct of a medical treatment or procedure.

11. The device according to claim 10 wherein the fluid is either blood, bodily fluid, medication, or a gas.

12. A kit for configuring an educational toy comprising:
   a 3-dimensional, hollow article made up of a sculptured front member and a sculptured rear member attached at a rim of the front member, wherein the sculptured front member and the rear member together resemble a life-form or an organ;
   a hollow deformable member to provide a variable interior volume disposed in an interior of the 3-dimensional hollow article;
   a connector with a first end, a second end and a bore for fluid communication between the first and second ends, the connector affixed in the interior of the 3-dimensional, hollow article so that the first end is exposed to an exterior; and a tube for connecting the hollow deformable member to the second end of the connector in leak-proof fluid communication.

13. A kit according to claim 12, further comprising a medical component for disposing in the 3-dimensional, hollow article, the medical component selected from the group consisting of: a syringe, a needle-free intravenous catheter, an intravenous cannula, a collection tube or container, a connector tube extension set, an adapter, a self-sealing plug, a drip bag, a feeding tube, a nebulizer, a colostomy bag, a stoma bag, and an implant.

* * * * *